July 28, 1959 R. F. STEHLIK 2,897,285

INTERCOMMUNICATING SYSTEM

Filed Jan. 14, 1957 4 Sheets-Sheet 1

INVENTOR.
RUDOLPH F. STEHLIK
BY C. R. Sipe
ATTY.

July 28, 1959 R. F. STEHLIK 2,897,285

INTERCOMMUNICATING SYSTEM

Filed Jan. 14, 1957 4 Sheets-Sheet 2

INVENTOR.
RUDOLPH F. STEHLIK
BY C. R. Sipe
ATTY.

July 28, 1959 R. F. STEHLIK 2,897,285

INTERCOMMUNICATING SYSTEM

Filed Jan. 14, 1957 4 Sheets-Sheet 3

INVENTOR.
RUDOLPH F. STEHLIK
BY C. R. Sipe
ATTY.

July 28, 1959

R. F. STEHLIK 2,897,285

INTERCOMMUNICATING SYSTEM

Filed Jan. 14, 1957

4 Sheets-Sheet 4

INVENTOR.
RUDOLPH F. STEHLIK
BY E. R. Sipe
ATTY.

United States Patent Office 2,897,285

Patented July 28, 1959

2,897,285

INTERCOMMUNICATING SYSTEM

Rudolph Frank Stehlik, Antwerp, Belgium, assignor to General Telephone Laboratories, Incorporated, a corporation of Delaware Application January 14, 1957, Serial No. 633,948

25 Claims. (Cl. 179—31)

This invention relates in general to telephone systems, but more particularly to small intercommunicating or house systems of the trunk connected secret service type.

It is a general object of the present invention to provide an improved intercommunicating system having a plurality of intercom trunks common to a plurality of stations arranged so that a first connection may be completed over the first common intercom trunk between any calling and called stations, and that a second connection may be completed over the second common intercom trunk between any of the remaining calling and called stations without interfering with the connection established over the first intercom trunk.

A particular feature of this invention relates to the provision of a line relay per station for each common intercom trunk in combination with a common battery feed relay individual to each intercom trunk and wherein the common battery feed relays control the operating, holding, and lock-out circuits of the station line relays to provide non-interfering or secret service.

Another feature relates to novel circuit arrangements for transmitting a tone to the calling station to indicate that the called station is being signalled, for removing such tone when the signalled station answers, while an absence of said tone signal indicates that the called line is busy in another connection.

A further feature relates to an arrangement whereby when both intercom trunks are in use a low all-trunk-busy tone is connected to the second intercom trunk after a predetermined delay to invite the stations connected to the second intercom trunk to limit their conversation.

Further features and objects of the invention will be apparent from the following description, reference being made to the acocmpanying drawings comprising Figs. 1 to 4, inclusive, which show sufficient apparatus to enable the invention to be described and understood.

Figs. 1 to 4 inclusive, diagrammatically illustrates eleven intercom stations, two trunk lines to a distant main telephone exchange, two common intercom trunks and the battery feed relays for the two intercom trunks.

*General description*

Figure 1:
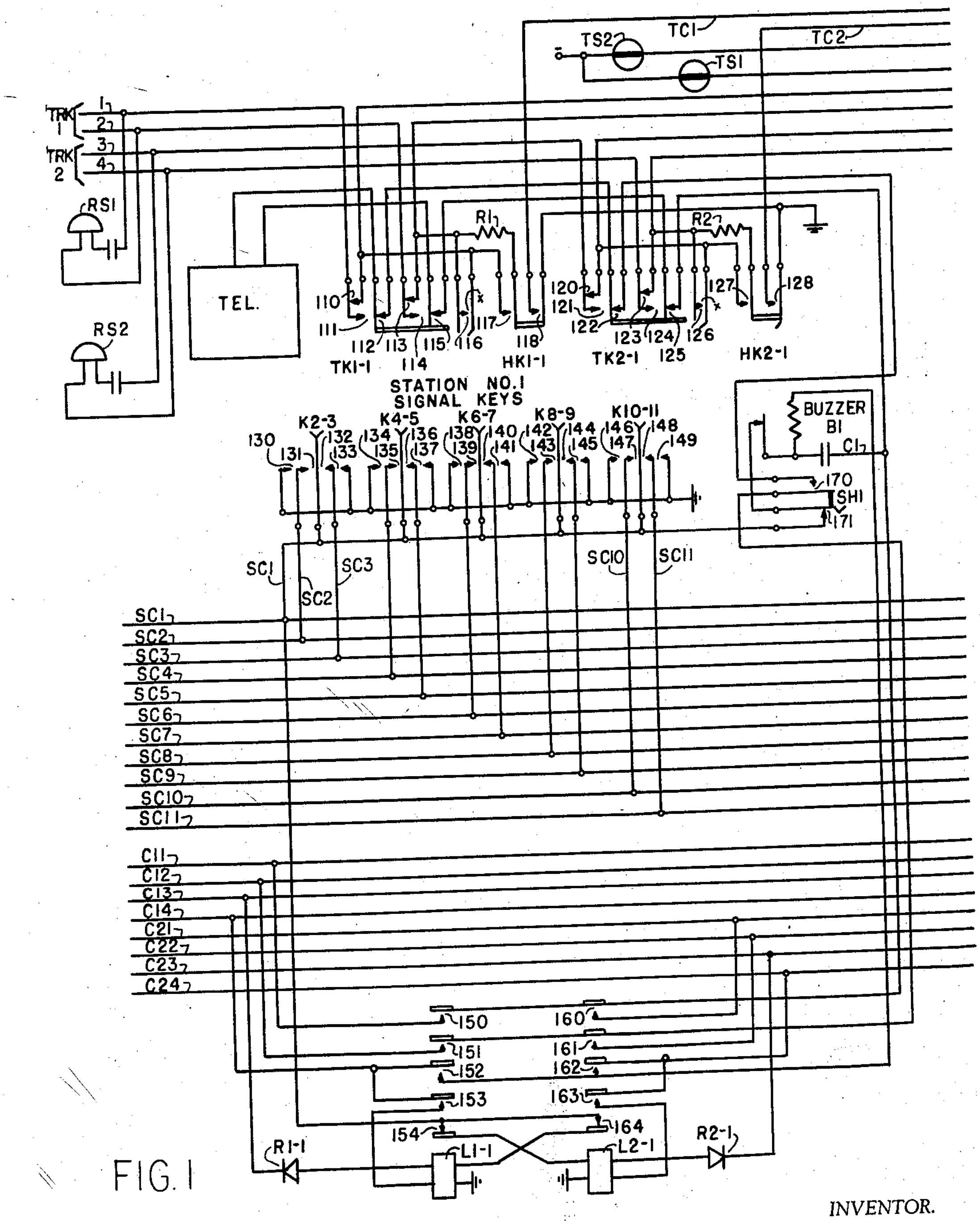

Fig. 1 shows the detail circuit arrangements at station No. 1, including a plurality of trunk keys TK1–1 and TK2–1 terminating two main exchange trunk lines for interconnecting this intercommunicating system to a nearby main exchange, trunk signals TS1 and TS2 for visually indicating when such trunk lines are busy, and ringing signals RS1 and RS2 which are operated on incoming calls from the main exchange. These ringing signals may be located so as to be audible to one or more of the various stations. A plurality of station selecting non-locking keys, such as K2–3, K4–5, etc., are shown connected to signalling conductors, such as signalling conductors SC2, SC3, etc., each of which are individual to a particular station. These station selecting keys are shown as double-throw keys each terminating a pair of signalling conductors and could just as well be singlethrow keys each terminating a single signalling conductor. A first common intercom trunk, comprising conductors C11 to C14, is shown connected to the station individual line relay L1–1 for operatively controlling the conection of the first intercom trunk to station No. 1. A second intercom trunk, comprising conductors C21 to C24, is shown connected to the station individual line relay L2–1 for operatively controlling the connection of the second intercom trunk to station No. 1. Station No. 1 is provided with a well-known telephone substation set of the automatic cradle type having the usual calling device, induction coil, transmitter and receiver all of which are not shown but are diagrammatically illustrated by the square TEL. The telephone substation also includes switch-hook springs indicated at SH1, a buzzer B1, and a terminal block, such as TB1, for cross connecting the respective individual signalling conductors such as SC1 to SC11 to the various stations in the systems.

The trunk key TK1–1 and HK1–1 is in effect one trunk key, individual to trunk No. 1, but divided into two sections. The section TK1–1 is for connecting and disconnecting trunk No. 1 to the station No. 1 telephone set, while the section HK1–1 is used for holding a trunk while station No. 1 calls another station over the intercom trunk to advise such called station that they are wanted on trunk No. 1. When the trunk key for trunk 1 is initially operated both sections TK1–1 and HK1–1 are operated and locked in operated position. The "X" springs of TK1–1 closing first to bridge the line conductors 1 and 2 to stop ringing current in the well-known manner. If station No. 1 desires to transfer the trunk call to another station, section TK1–1 is restored while section HK1–1 remains operated to hold the main exchange connection. The called station is then advised that they are wanted on trunk No. 1 and such called station then operates his corresponding trunk key after which the hold section springs HK1–1 may be restored at station No. 1. These trunk keys may be mounted on the telephone substation set and are similar to the trunk keys and operating mechanism shown in British Patent 623,402, sealed September 2, 1949.

Trunk key TK2–1 and HK2–1 is individual trunk No. 2, and is similar in all respects to trunk key TK1–1 and HK1–1. In addition, levers are provided, as shown in the above mentioned British patent, whereby the operation of a second trunk key, after the operation of a first trunk key, causes both of the TK and HK spring sections of the second trunk key to operate and lock, and causes the TK springs of the first trunk key to restore while the HK springs of the first trunk key are maintained operated to enable the station to transfer back and forth between the two trunks. Any operated and locked trunk keys are automatically restored when the subscriber replaces his handset on the cradle.

Figure 2:
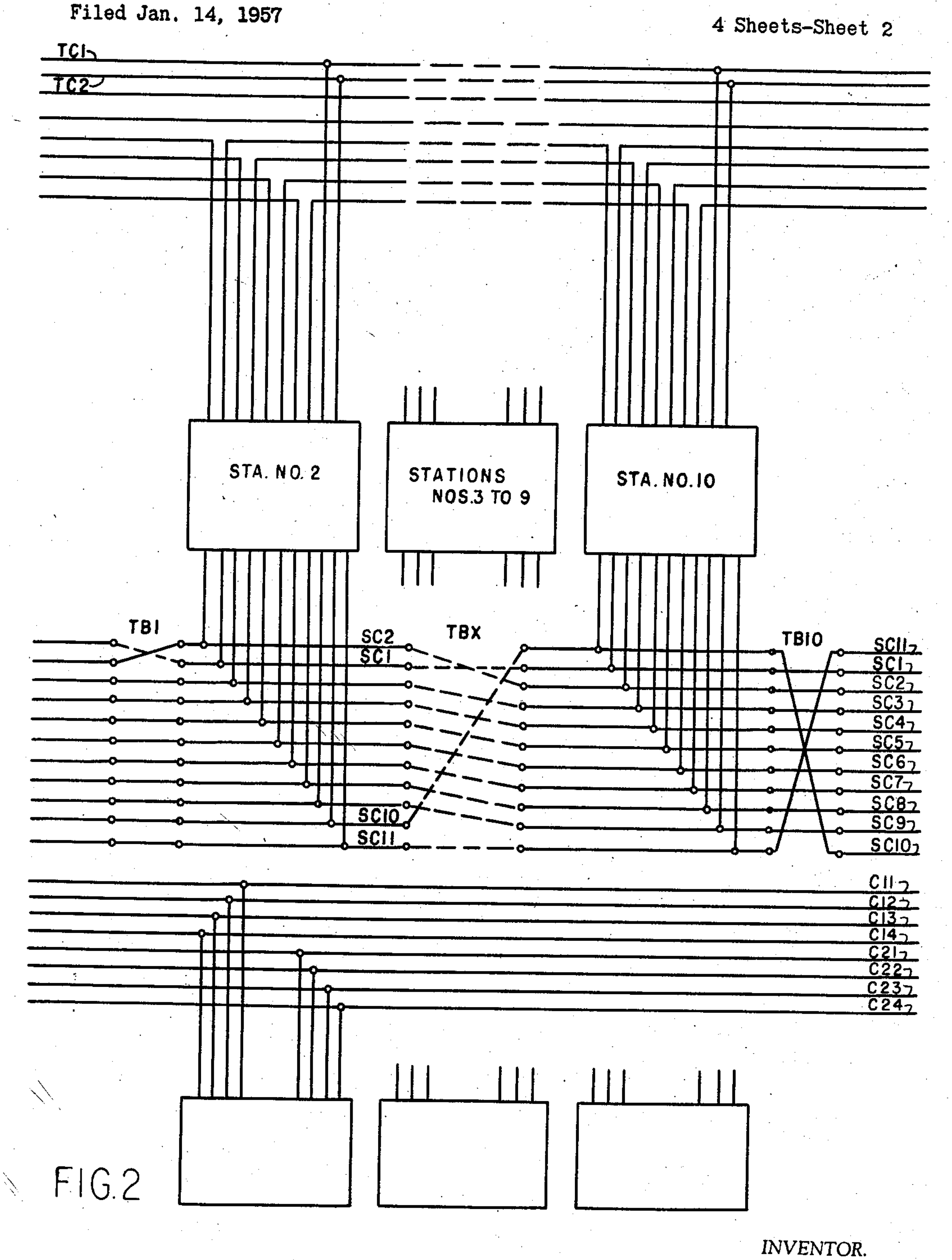
Figure 3:
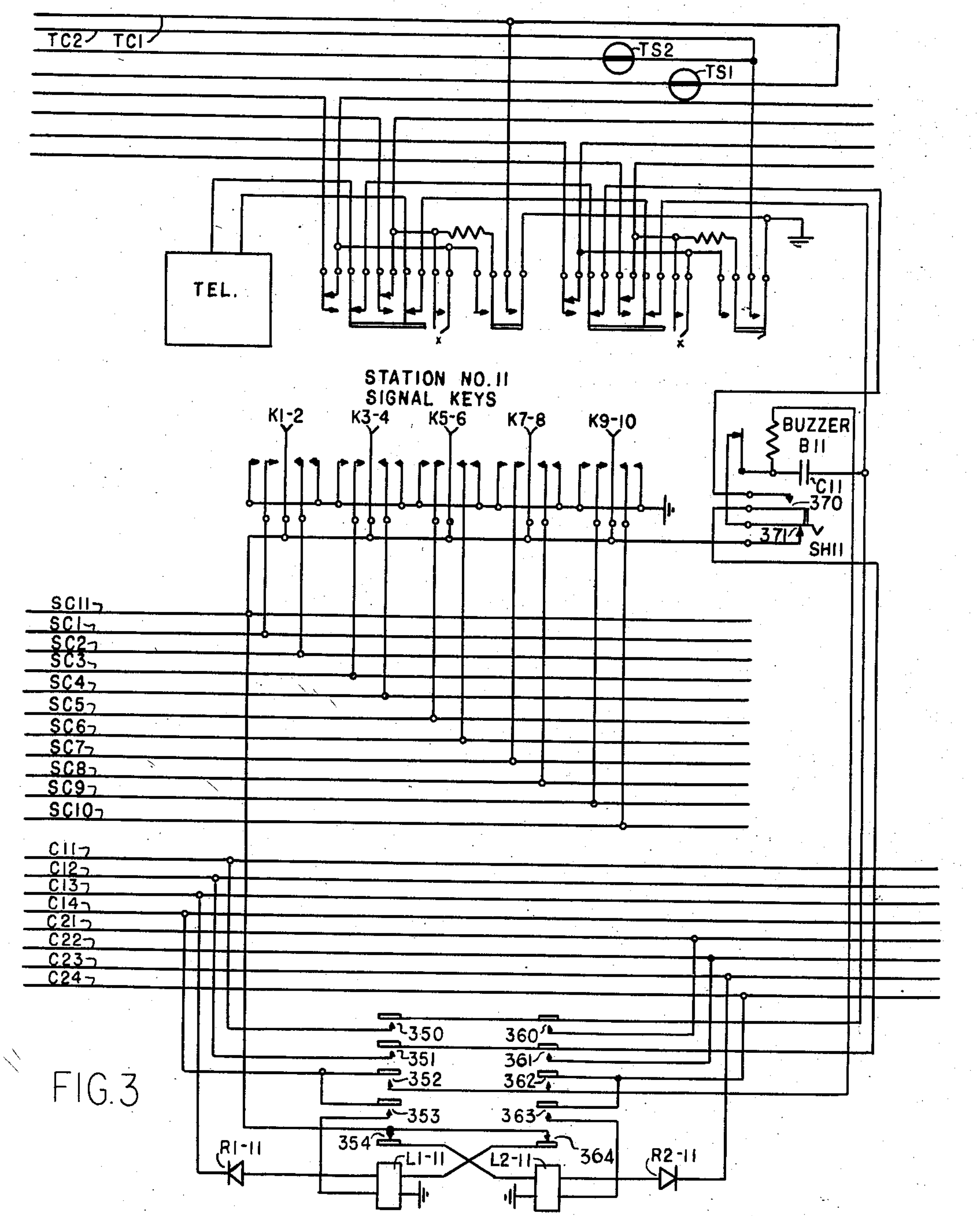

Fig. 2 diagrammatically illustrates stations 2 to 10 inclusive, and Fig. 3 shows station No. 11 all of which are equipped and connected in a manner similar to that described for station No. 1. Fig. 2 also illustrates how the individual signalling conductors SC1 to SC11 are cross-connected at the terminal blocks, such as TB1—TB10. A terminal block is mounted in the base of each telephone substation set for terminating and interconnecting such signalling conductors between the various stations and to the respective signalling keys.

Figure 4:
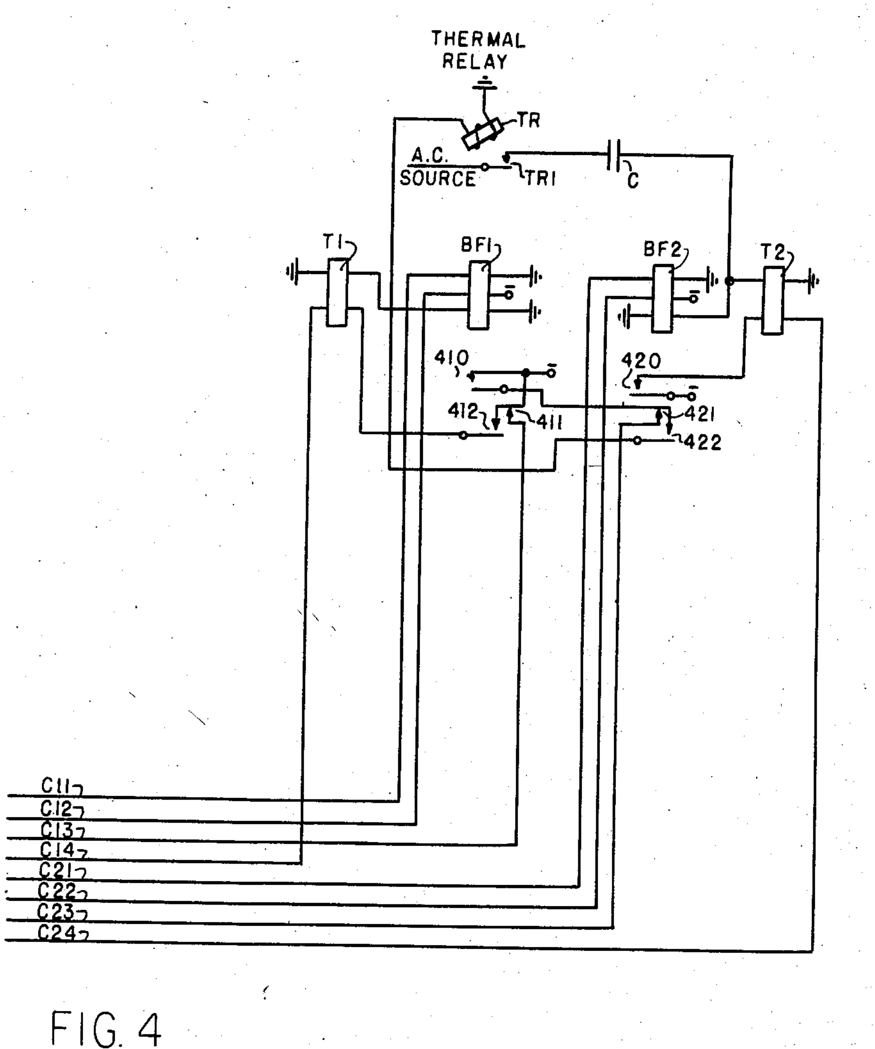

Fig. 4 shows two battery feed relays BF1 and BF2 which are individual to the respective common intercom trunks, such as the first intercom trunk comprising conductors C11 to C14 and the second intercom trunk comprising conductors C21 to C24. A transformer, such as T1, is associated with the first battery feed relay BF1, and another transformer T2 is associated with the second battery feed relay BF2. A thermal relay TR is shown in Fig. 4 for connecting an A.C. tone source to a winding of relay BF2 and a winding of transformer T2 to induce a special tone in the second intercom trunk when both intercom trunks are in use. A twelve volt telephone battery may be used to supply positive and negative current for the system, or a well-known full wave rectifier network may be provided, instead of a battery, for supplying positive or negative current. Throughout the drawing the ground symbol is used to indicate positive pole of the current source while the usual negative pole symbol is used to indicate negative pole of the current source.

A general description of the system and the apparatus employed having been described, a detailed description of the operation will now be given, in order to provide a complete understanding of the invention.

*Intercom calls*

It will now be assumed that Station No. 1 desires to call station No. 11 over an intercom trunk. In response to the removal of the handset from its cradle the switch hook springs 171 open the circuit to buzzer B1 while springs 170 connect the telephone set through the trunk key contacts 112, 115, 122, 125 to the make contacts of the individual line relays L1–1 and L2–1. In order to signal the called station key K10–11 is operated to the right to ground signal conductors SC1 and SC11. The grounding of conductor SC1 completes a circuit for operating line relay L1–1 providing the first intercom trunk is not in use. The circuit for operating line relay L1–1 may be traced as follows: ground, contacts 149 and 148, conductor SC1, contacts 164, upper winding of relay L1–1, rectifier R1–1, operate conductor C13, and contacts 411 to battery. Line relay L1–1 closes contacts 150 and 151 to complete an operating circuit for common battery feed relay BF1 over the calling subscriber's loop and the talking conductors C11 and C12 of the first intercom trunk. At contacts 153, line relay L1–1, prepares a locking circuit for itself, and at contacts 154 opens a point in the operating circuit of line relay L2–1 to prevent operation of the latter relay.

The grounding of signal conductor SC11 by the operation of key K10–11 completes a circuit for operating line relay L1–11 at the called station as follows: ground, contacts 149, conductor SC11, contacts 364, upper winding of line relay L1–11, rectifier R1–11, operating conductor C13, and contacts 411 to battery. Line relay L1–11 at the called station closes contacts 350 and 351 to prepare the talking circuit; at contacts 352 prepares a circuit for operating the called stations buzzer B11; at contacts 353 prepares a locking circuit for itself; and at contacts 354 opens a point in the operating circuit of line relay L2–11 to prevent operation of the latter relay.

When the battery feed relay BF1 is operated over the calling station's loop, contacts 410 close to connect battery by way of contacts 421 to operating conductor C23 of the second intercom trunk in order to permit other connections to be completed over the second intercom trunk. Contacts 411 disconnect battery from the operating conductor C13, to prevent the operation of any other station line relays associated with the first intercom trunk to thereby provide secret service. Contacts 412 connects battery by way of the lower winding of transformer T1 to the combined signal and hold conductor C14 of the first intercom trunk to complete the prepared locking circuits of line relays L1–1 and L1–11 and to complete a circuit for operating the buzzer B11 at the called station. The circuit for locking line relay L1–1 may be traced as follows: ground, lower winding of line relay L1–1, contacts 153, combined hold and signal conductor C14, lower winding of transformer T1, and contacts 412 to battery. The circuit for locking relay L1–11 may be traced from ground through the lower winding of relay L1–11, contacts 353, conductor C14, lower winding of transformer T1, to battery at contacts 412. The circuit for operating the called station buzzer B11 may be traced as follows: ground, contacts 149 of operated signalling key K10–11, signal conductor SC11, switch-hook contacts 371 of the called station, through the buzzer interrupter contacts and winding of buzzer B11, contacts 352, combined hold and signal conductor C14, lower winding of transformer T1, contacts 412 to battery. The called station buzzer B11 operates each time the key K10–11 is operated at the calling station to audibly signal the called subscriber. The buzzer interrupter contacts at the called station intermittently opens and closes the signalling circuit, and since this circuit passes through the lower winding of transformer T1 a tone is induced into the upper winding of transformer T1 and is transmitted to the lower winding of battery feed relay BF1. The tone in the lower winding of battery feed relay BF1 induces a tone in the upper windings of this relay to thereby transmit a tone over the heavy talking conductors C11 and C12 to the calling station to advise such station that the called station is being signalled. In case both intercom trunks were busy at the time station No. 1 made this call, then neither line relay at the calling station is operated and no circuit is completed for the called station buzzer with the result that the calling station does not receive a tone, commonly known as a "ring-back" tone, indicating that the called station is being signalled. Also if the called station is busy in another connection, either over another intercom trunk or over a main exchange trunk, then the called station switch-hook contacts such as 371, open the circuit to the called station buzzer, such as B11, to prevent the "ring-back" tone to be transmitted to the calling station. An absence of such a tone therefor indicates to the calling station that all the intercom trunks are busy, or that the called station is busy in another connection.

When the called station answers by removing his handset from the cradle, the switch hook springs 371 open the buzzer circuit to stop the ring-back tone to the calling station thereby indicating that the called station has answered, and the switch-hook springs 370 close to complete the talking circuit between the calling and called stations over the talking conductors C11 and C12 of the first intercom trunk. The talking circuit may be traced as follows: from the calling station telephone set, normally closed contacts and 112, 115, 122 and 125 of the trunk keys TK1–1 and TK2–1, switch hook contacts 170, contacts 150 and 151, first intercom talking conductors C11 and C12, contacts 350 and 351, switch hook contacts 370, through the normally closed contacts of trunk keys TK2–11 and TK1–11 to the called station telephone set. Talking battery is fed to the conductors C11 and C12 through the windings of relay BF1.

After conversation, and when both subscriber's replace their handsets to open their respective switch-hook contacts, the circuit to battery feed relay BF1 is opened and the relay restores. Relay BF1, upon restoring, at contacts 410 disconnects battery from operate conductor C23, at contacts 412 disconnects battery from combined hold and signal conductor C14 to cause line relays L1–1 and L1–11 to restore, and at contacts 411 reconnects battery to operate conductor C13 to enable other connections to be completed over the first intercom trunk. Line relay L1–1 at the calling station restores to disconnect station No. 1 from the common talking conductors C11 and C12 at contacts 150 and 151. Contacts 152 disconnects the station No. 1 from conductor C14, contacts 153 opens a point in its own locking circuit, and at contacts 154 prepares the operating circuit for line relay L2–1. Line relay L1–11 at the called station restores and in a similar manner disassociates the called station from the first intercom trunk.

It will now be assumed that the first interecom trunk is in use by other stations when station No. 1 calls station No. 11. Under these conditions the battery feed relay BF1 is operated and the operate conductor C23 is conditioned by connecting battery thereto through operated contacts 410 of relay BF1, while operate battery is disconnected from operate conductor C13 at contacts 411 during the time the first intercom trunk is in use to prevent operation of the line relays associated with the first intercom trunk. When station No. 1 removes his receiver and operates key K10–11 to the right line relays L2–1 and L2–11 are operated to connect the calling and called stations to the second intercom trunk and to operate battery feed relay BF2. Relay L2–1 is operated over the following circuit: ground, contacts 149 and 148, conductor SC1, contacts 154, upper winding of relay L2–1, rectifier R2–1, operate conductor C23, contacts 421 and 410 to battery. Relay L2–11 is operated from ground contacts 149, conductor SC11, contacts 354, upper winding of relay L2–11, rectifier R2–11 to battery on operate conductor C23. Contacts 160 and 161 of line relay L2–1 extends the calling loop at station No. 1 over conductors C21 and C22 to operate battery feed relay BF2. Contacts 163 prepares a locking circuit for relay L2–1 and contacts 164 opens the circuit to relay L1–1. Contacts 360 and 361 of line relay L2–11 connects the talking conductors of the called station to conductors C21 and C22. Contacts 362 prepares a circuit for operating the buzzer B11 at the called station; contacts 363 prepares a locking circuit for relay L2–11; and contacts 364 opens the circuit to relay L1–11.

When battery feed relay BF2 operates over the calling loop, contacts 420 connects battery through the lower winding of transformer T2 to the combined hold and signal conductor C24 to lock relays L2–1 and L2–11 operated and to complete the circuit for operating buzzer 11 at the called station. Contacts 421 open to disconnect battery from operate conductor C23 to prevent the operation of any further station line relays associated with the second intercom trunk. Contacts 422 close to connect battery at contacts 410 to the thermal relay TR. The circuit for operating buzzer B11 may be traced as follows: ground, contacts 149 of key K10–11, signal inductor SC11, switch-hook contacts 371 of the called station, interrupter contacts and buzzer B11, contacts 362, conductor C24, lower winding of transformer T2, and contacts 420 to battery. The buzzer B11 is operated each time the key K10–11 is operated to signal the called station. The interrupter contacts of buzzer B11 intermittently opens and closes to generate a tone in the lower winding of transformer T2. This tone is induced into the upper winding of transformer T2 and into the lower winding of relay BF2. The tone in the lower winding of relay BF2 induces a tone in the upper windings of relay BF2 to transmit a so-called ring-back tone over conductors C21 and C22 to the calling station to advise the calling subscriber that the called station is idle and is being signalled. In case the called station was busy when called by station No. 1, then one of the called station line relays, such as relay L1–11, would be operated to open the circuit to line relay L2–11 to prevent the operation of relay L2–11; and in this case, since no circuit is closed for operating the called station buzzer B11, the calling subscriber does not receive the ring-back tone and is therefore advised that the called station is busy in another connection.

When the called station answers switch-hook springs 371 opens to signalling circuit thereby opening the buzzer circuit to stop the transmission of ring-back tone to the calling station to advise him that the called station has answered. Switch hook springs 370 close to operatively connect the called station to the talking conductors C21 and C22 of the second intercom trunk to enable the calling and called stations to talk.

Thermal relay TR operates after a predetermined time provided both intercom trunks are busy and the battery feed relays BF1 and BF2 are operated. At contacts TR1, relay TR connects the alternating current source AC, via condenser C, to the lower winding of battery feed relay BF2 which induces a special all-trunk-busy tone in the upper windings of relay BF2 to thereby transmit this special tone over the talking conductors C21 and C22 of the second interecom trunk to advise the stations connected to this trunk that both trunks are busy and that they should limit their conversation. However, in case the stations connected to the first intercom trunk replace their receivers then relay BF1 restores and at contacts 410 opens the circuit to relay TR which then restores to disconnect the special all-trunk-busy tone from the second intercom trunk.

When both the calling and called stations replace their receivers the circuit to battery feed relay BF2 is opened at the switch-hook contacts to restore relay BF2. Relay BF2 at contacts 420 disconnects battery from conductor C24 to open the locking circuits of relays L2–1 and L2–11 to cause the latter relays to restore.

It should be noted at this time that the battery feed relay is maintained operated in case only one of the stations hang up in which case both of the operated line relays are maintained operated over the hold-conductor, such as C24. This arrangement permits the station which has hung up to again remove his receiver and be reconnected to the intercom trunk. This arrangement enables the subscriber to be disconnected from an intercom connection in order to answer an incoming trunk call from a near-by exchange and to later return to the intercom connection after termination of the incoming trunk call when the trunk keys are in their normal positions by merely replacing and removing the handset from its telephone cradle.

A conference may be called by any station by removing his receiver and simultaneously operating the signal keys of the called stations desired in the conference. The simultaneous operation of the respective called station signal keys at the calling station simultaneously grounds the individual signalling conductors to simultaneously operate the individual line relays at the called stations. The operated line relays lock operated when the common battery feed relay operates. Ground on each of the individual signalling conductors cause the operation of the called station buzzers through operated contacts of the operated line relays in a manner apparent from the foregoing description. Any one or more of the stations included in a conference connection may disconnect from the conference by replacing their receivers and may be reconnected to the conference connection merely by removing their receivers because as long as any one of the stations remains connected to the intercom trunk the common battery feed relay and the operated station line relays remain operated until all stations replace their receivers.

*Main exchange trunk calls*

Trunk keys, such as trunk keys TKL–1, TK2–1, TK1–11 and TK2–11, are provided at each of the stations to initiate and answer trunk calls to and from a near-by manual or automatic telephone exchange. It will now be assumed that an incoming call is received over a first exchange trunk line comprising trunk conductors 1 and 2. Ringing current on conductors 1 and 2 operates the ringing signal RS1 which is located where it is audible to one or more stations and any one of these stations may answer the trunk call. In case station No. 1 answers the call by operating trunk key TK1–1 and HK1–1, contacts 116 close first to close a bridge across the line conductors 1 and 2 before contacts 110 and 113 are opened to cut off the ring in a well-known manner; contacts 111 and 114 connect the talking conductors of station No. 1 to the trunk conductors 1 and 2; and contacts 112 and 115 open to disconnect the station talking conductors from the trunk key of the second exchange trunk line and from the intercom trunk lines. Contacts 110 and 113 open the series connections of the trunk line conductors 1 and 2 to the remaining stations in the intercommunicating system. Contacts 117 close to prepare a holding bridge for trunk 1 in case station No. 1 wants to hold this trunk while making or answering another call. Contacts 118 close to ground conductor TC1 to operate the trunk signals, such as TS1 and TS11, in series to indicate at all stations that trunk 1 is busy. Station No. 1 is now connected to trunk 1 through operated contacts 111 and 114.

In case another incoming trunk call is received over trunk 2 then ringing signal RS2 is operated by the ringing current to audibly signal such a call. Any one of the stations may answer this call by operating the trunk key individual to the calling trunk. In this case it will be assumed that while station No. 1 is connected to trunk 1, an incoming call is received over trunk 2, and that station No. 1 answers the call on trunk 2 by operating trunk key TK2–1 and HK2–1. As previously described the operation of second trunk key TK2–1 and HK2–1 causes the first set of contacts of TK1–1 of the first trunk key to restore while the second set of contacts HK1–1 of the first trunk key are maintained operated. The closing of contacts 110 and 113 closing a holding bridge, including resistance R and contacts 117, across the trunk conductors 1 and 2 to hold the first trunk. The closing of contacts 112 and 115 connects the talking conductors of station No. 1 to closed contacts 121 and 124 of operated trunk key TK2–1 and to the line conductors 3 and 4 of the second trunk line. In a manner similar to that previously described, the operation of the second trunk key TK2–1 and HK2–1, first causes "X" contacts 126 to close first and bridge line conductors 3 and 4 to cut-off the ring, disconnects the remaining stations from trunk 2 at contacts 120 and 123, disconnects the intercom trunk connections at contacts 122 and 125, and completes the talking circuit from station No. 1 to line conductors 3 and 4 at contacts 121 and 124. Contacts 127 prepares a holding bridge for trunk 2 and contacts 128 grounds conductor TC2 to operate the trunk signals, such as TS2 and TS11, at all stations. After conversing over trunk 2, station No. 1 may be disconnected from trunk 2 by fully restoring trunk key TK2–1 and HK2–1 to reconnect the intercom connections by way of contacts 122 and 125 to station No. 1 and to close contacts 120 and 123 to extend trunk 2 to the other stations in the system. Contacts 127 are also opened to open the holding bridge including resistance R2 so that the holding bridge is not closed when contacts 120 and 122 close, and contacts 128 disconnect ground from conductor TC2 to restore the trunk signals such as TS2 and TS11. At this time, station No. 1 may call and converse with an intercom station over one of the intercom trunks in the same manner as previously described, and then disconnect from the intercom trunk and be reconnected to trunk 1 by reoperation of the TK1–1 portion of the first trunk key.

When station No. 1 has completed a conversation over trunk 1 the replacement of the receiver automatically restores all operated trunk keys in the manner shown, and described in the previously cited British patent. The restoration of the operated trunk key then prepares station No. 1 for connection to either one of the intercom trunks at contacts 112 and 115; contacts 110 and 113 extend the trunk conductors 1 and 2 to the succeeding stations, contacts 117 open the holding bridge, and contacts 118 disconnects ground from conductor TC1 to restore the trunk signals, such as TS1 and TS11.

It will be noted that trunks 1 and 2 are series connected through the trunk keys at successive stations in the system thereby giving preference to a preceding connected station over a succeeding connected station.

In case station No. 1 answers a trunk call on trunk 1 and the distant subscriber desired to converse with another station, for example station No. 11, then station No. 1 will partially restore the 1st trunk key to cause the contacts associated with the TK1–1 portion of the trunk key to restore to normal while the contacts associated with the HK1–1 portion of the first trunk key remain operated to hold trunk 1 while station No. 1 calls station No. 11 over the intercommunicating system to advise such called station that he is wanted on a call on trunk 1. Station No. 11 then operates his trunk key TK1–11 and HK1–11 to connect his telephone set to the trunk line station No. 1 now restores his handset to thereby automatically restore trunk key TK1–1 to complete the connection over trunk 1 and the operated trunk key contacts of trunk key TK1–11 in a manner apparent from the foregoing description. In a similar manner any station can transfer a trunk call to any other station.

Outgoing trunk calls from any station may be completed over either trunk 1 or trunk 2 by operating either trunk key.

Station No. 1 operates the first trunk key TK1–1 and HK1–1 thereby closing contacts 111 and 114 to connect the substation set to trunk conductors 1 and 2 while contacts 110 and 113 disconnects trunk 1 from the succeeding station. After connection of the substation telephone set to trunk 1, the call may be completed manually to an operator, or automatically, if the nearby exchange is an automatic exchange, in the well-known manner.

The invention having now been fully described, what is considered now and is desired to be protected by Letters Patent, is set forth in the following claims.

What is claimed is:

1. In an intercommunication system, a plurality of stations, a first and a second intercom trunk common to said stations, a first battery feed relay individual to said first trunk, a second battery feed relay individual to said second trunk; each of said stations having a first line relay individual to said first trunk, a second line relay individual to said second trunk, an individual signal, and a plurality of call keys respectively corresponding to the other said stations; a first common operating circuit for supplying operating current for said first line relays controlled by said first battery feed relay, a second common operating circuit for supplying operating current for said second line relays controlled jointly by said first and second battery feed relays, means responsive to the operation of the key at a first calling station corresponding to a desired first called station for operating said first line relays of the calling and called stations over said first common operating circuit, means responsive to the operation of said calling station first line relay for operatively connecting said first trunk to said calling station and for operating said first battery feed relay over said first trunk, a signalling circuit completed responsive to the operation of said first battery feed relay and said called station first line relay by the continued operation of said key for operating the signal at said called station, means responsive to the operation of said first battery feed relay for disabling said first common operating circuit to prevent operation of the first line relays of the remaining stations and for enabling said second common operating circuit to permit operation of the second line relays of said remaining stations, means responsive to the operation of the key at a second calling one of said remaining stations corresponding to second called one of said remaining stations for operating the second line relays of said second calling and called stations over said second enabled common operating circuit, means responsive to the operation of said second calling station line relay for operatively connecting said second trunk to said second calling station and for operating said second battery feed relay over said second trunk, a second signalling circuit completed responsive to the operation of said second battery feed relay and said second called station second line relay by the continued operation of said last mentioned key for operating the signal at said second called station, and means for completing a first talking connection over said first trunk between said first calling and called stations when said first called station answers and for completing a second talking connection over said second trunk between said second calling and called stations when said second called station answers.

2. An intercommunication system as claimed in claim 1 including contacts on each of said line relays for preventing the operation of more than one line relay at each station to thereby prevent the simultaneous connection of one of said stations to both said trunks.

3. In an intercommunicating system, a plurality of stations, a first and a second intercom trunk common to said stations, enabling means whereby said first trunk is normally enabled for use in establishing connections between said stations and said second trunk is normally disabled for use in establishing connections between said stations, a first means including said enabling means for establishing a first connection over said first trunk between a first calling station and a first called station, said enabling means controlled by said first means while said first trunk is in use for disabling said first trunk for use in establishing connections between the remaining stations and for enabling said second trunk for use in establishing connections between said remaining stations, a second means including said enabling means for establishing a second connection over said enabled second trunk between a calling one and a called one of said remaining stations while said first trunk is in use, and said enabling means controlled by said second means while said second trunk is in use for disabling said second trunk for use in establishing other connections between said stations.

4. An intercommunicating system as claimed in claim 3 wherein said first and second means include a plurality of call keys at each said station respectively corresponding to the other said stations, and wherein the momentary operation of the key at the calling station corresponding to the desired called station causes the calling and called stations to be connected to said trunk and the called station to be selectively signalled.

5. An intercommunicating system as claimed in claim 4 including a first and a second line relay individual to each station, and wherein said first means includes the first line relay of said calling and called stations for connecting said first trunk to said first calling and called stations and said second means includes the second line relays of the second calling and called stations for connecting said second trunk to said second calling and called stations.

6. An intercommunicating system as claimed in claim 5 including signalling circuits for signalling said called stations, and contacts on said operated line relays of said called stations for completing said signalling circuits during the operation of said keys at said calling stations corresponding to said called stations.

7. An intercommunicating system as claimed in claim 3 wherein said first and second means includes a plurality of non-locking keys at each station, each key corresponding to a particular station, and multiple connections connecting corresponding station keys at the other of said stations to said corresponding station.

8. An intercommunicating system as claimed in claim 3 wherein said enabling means includes a first battery feed relay individual to said first trunk, a second battery feed relay individual to said second trunk, a source of current, and contacts controlled by said battery feed relays for connecting and disconnecting said source to and from said trunks for enabling and disabling said first and second trunks.

9. An intercommunicating system as claimed in claim 3 including a first and a second line relay individual to each station, and wherein said first means includes the first line relays of said first calling and called stations for connecting said first trunk to said first calling and called stations, and said second means includes the second line relays of the second calling and called stations for connecting said second trunk to said second calling and called stations, and contacts on each of said line relays for preventing the operation of more than one line relay at each station.

10. In an intercommunicating system, a plurality of stations, an intercom trunk common to said stations, a battery feed relay for said trunk; each of said stations having an individual line relay, an individual signal, and a plurality of call keys respectively corresponding to the other said stations; a common operating circuit for supplying operating current for said line relays controlled by said battery feed relay, means responsive to the operation of the key at a calling station corresponding to a desired called station for operating the individual line relays of the calling and called stations over said common operating circuit, means responsive to the operation of said calling station line relay for operatively connecting said trunk to said calling station and for operating said battery feed relay over said trunk, a signalling circuit completed responsive to the operation of said battery feed relay and said called station line relay by the continued operation of said key for operating the signal at said called station, and means responsive to the operation of said battery feed relay for disabling said common operating circuit to prevent operation of the line relays of the remaining stations.

11. An intercommunicating system as claimed in claim 10 including means for locking said operated calling and called line relays in operated position over a portion of said signalling circuit and independent of the operated or non-operated condition of said key.

12. An intercommunicating system as claimed in claim 10 including means responsive to the called station answering for disabling said signalling circuit at said called station to stop the operation of said called station signal and for operatively connecting said called station to said trunk over a circuit controlled by said called station line relay to complete a talking connection between said calling and called station over said trunk.

13. An intercommunicating system as claimed in claim 10 wherein inductive means including said battery feed relay is controlled over said signalling circuit during the operation of said called station signal for transmitting a tone over said trunk to said calling station to indicate the signalling of said called station.

14. An intercommunicating system as claimed in claim 10 including inductive means for transmitting a tone over said trunk to said calling station to indicate that said called station is idle and is being signalled, and wherein the absence of such a tone being transmitted to said called station is an indication that said called station is busy in another connection.

15. In an intercommunicating system, a plurality of stations, an intercom trunk common to said stations, a battery feed relay for said trunk; each of said stations having an individual line relay, an individual signal, and a plurality of call keys respectively corresponding to the other said stations; means responsive to the operation of the key at a calling station corresponding to a desired called station for selectively operating the individual line relays of the calling and called stations, means operated by the operated line relays for connecting said calling and called stations to said intercom trunk and for operating said battery feed relay over said trunk, means responsive to the operation of said battery feed relay for locking said line relays in operated position and in response to the continued operation of said key for operating the signal at said called station, and means responsive to the called station answering for stopping the operation of said signal and for operatively connecting said called station to said intercom trunk to complete a talking connection between said calling and called stations.

16. An intercommunicating system as claimed in claim 14 including circuit means responsive to the operation of said called station signal for transmitting a tone over said trunk to said calling station to indicate that said called station is being signalled.

17. An intercommunicating system as claimed in claim 14 including circuit means responsive to the operation of said called station signal for transmitting a tone over said trunk to said calling station to indicate said called station is idle and is being signalled and the stopping of said tone by said answering means at said called station indicating to the calling station that the called station has answered, and means effective in case said trunk is busy in another connection between other stations for indicating such busy condition to said calling station by an absence of tone during the operation of said key.

18. In an intercommunicating system, a plurality of stations and an intercom trunk common to all said stations; said trunk having a pair of line conductors, a battery, a battery feed relay having two windings connecting said battery to said line conductors, a make contact on said battery feed relay, a combined hold and signal conductor connected to said make contact, a break contact on said battery feed relay connected to one pole of said battery, an operate conductor connected to said break contact; each of said stations having a line relay normally connected to said operate conductor, a signal, a plurality of call keys respectively corresponding to the other said stations, and an individual signal conductor for each station connected to corresponding keys at each station; circuit means responsive to the operation of the key at a calling station corresponding to a desired called station for connecting the other pole of said battery through said operated key to operate said calling station line relay over said operate conductor and said break contact, said operated key also connecting said other pole of battery to the individual signal conductor of said called station to operate said called line relay over said operate conductor and said break contact, means responsive to the operation of said calling station line relay for operatively connecting said calling station to said line conductors to operate said battery feed relay over its two windings, means for locking said calling and called station line relays over said make contact and said combined hold and signal conductor in response to the operation of said battery feed relay; a signalling circuit for operating the signal at said called station including said other pole of battery, the operated key at the calling station, the individual signal conductor of said called station, said called station signal, operated contacts on said called station line relay, said combined hold and signal conductor, and said make contact on said battery feed relay completed in response to the operation of said battery feed relay and the continued operation of said key, the operation of said battery feed relay operating said break contacts to disconnect said one pole of battery from said operate conductor to prevent operation of the line relays of the remaining stations, and means responsive to the called station answering for opening said signalling circuit to stop operation of said called station signal and for operatively connecting said called station to said line conductors to complete a talking circuit between the calling and called stations.

19. An intercommunicating system as claimed in claim 7 including a third winding on said battery feed relay and inducting means controlled over said signalling circuit during the operation of said called station signal for inducing a tone in said two windings of said battery feed relays to thereby transmit a tone to said calling station over said line conductors.

20. In an intercommunicating system, a plurality of stations, an intercom trunk common to said stations, a trunk key at each station, a central office trunk terminating in the trunk key at the first of said stations, a chain circuit serially connecting said central office trunk through the trunk keys at successive ones of said stations, a telephone circuit at each station, means at a calling one of said stations for completing a connection from the telephone circuits of said calling station and a plurality of called stations through said trunk keys at said calling and called stations to said intercom trunk to establish a conference connection, contacts on said trunk key at each station operative for connecting said central office trunk to said telephone circuit at such station and for disconnecting such telephone circuit from said intercom trunk in case such telephone circuit is connected to said intercom trunk, said chain circuit permitting only one of said telephone circuits at a time to be connected to said central office trunk, and the restoration of said trunk key at said last mentioned station again connecting said last station to said intercom trunk in the event at least one of said stations is still connected to said intercom trunk.

21. In an intercommunication system, a plurality of stations, a line relay individual to each station, a telephone circuit at each station, an intercom trunk common to said stations, a trunk key at each station, a central office trunk terminating in the trunk key at the first of said stations and serially connected through the trunk keys at successive ones of said stations, means at a calling one of said stations for operating its individual line relay and a line relay at the called one of said stations, contacts operated by said line relays for completing a connection from the telephone circuits of said calling and called stations through said trunk keys at said calling and called stations to said intercom trunk, contacts on said trunk key at each station operative for connecting said central office trunk to said telephone circuit at such station and for disconnecting such telephone circuit from said intercom trunk in case such telephone circuit is connected to said intercom trunk, and said series connection through said trunk keys permitting only one of said telephone circuits at a time to be connected to said central office trunk.

22. In an intercommunication system, a plurality of stations, a first and a second intercom trunk common to said stations, means for completing a first intercommunication connection over said first trunk between a first calling station and a first called station, means for completing a second intercommunication connection over said second trunk while said first trunk is in use between a second calling station and a second called station, a time delay device, a circuit for operating said device, means jointly controlled in response to both said first and second trunks being in use for completing said circuit to operate said device after a predetermined delay, and means controlled by the operation of said device for transmitting a tone to said second calling and called stations over said second trunk indicating that both said trunks are in use and that such stations should limit their conversation.

23. In an intercommunicating system, a plurality of stations, a first and a second intercom trunk common to said stations, a plurality of non-locking selective call keys associated with each station, each key corresponding to a particular one of said stations, a first connecting means connecting a first calling station to said first trunk for signalling and connecting a first plurality of called stations to said first trunk for use in a first conference connection responsive to the simultaneous operation of a plurality of said keys at said first calling station corresponding to said first plurality of called stations, a first locking means operated in response to the operation of said first plurality of keys for locking out the remaining stations to prevent connection of any one of said remaining stations to said first trunk, a second connecting means connecting a remaining second calling station to said second trunk for signalling and connecting a remaining second plurality of called stations to said second trunk for use in a second conference connection responsive to the simultaneous operation of a second plurality of said keys at a second calling station corresponding to said second plurality of called stations, a second locking means operated in response to the operation of said second plurality of said keys for locking out any further remaining stations to prevent connection of any one of said last mentioned remaining stations to said second trunk; and means operative in the event said second calling station operates a key corresponding to a first calling or a first called station included in said first conference connection for preventing the signalling and connection of such first calling or called station to said second trunk.

24. An intercommunicating system as claimed in claim 22 including means whereby each called conference station joins the conference by merely removing his station receiver and whereby any conferee leaves the conference by merely restoring his receiver, and means whereby any of the remaining conferees may recall such absent conferee by a momentary operation of the absent conferee's key at said recalling remaining conferee station.

25. An intercommunicating system as claimed in claim 22 including means for permitting each called conferee included in either conference connection to answer and be operatively connected to the respective trunk merely by lifting his telephone receiver at his station, and whereby any conferee can leave and rejoin the conference merely by restoring and later removing his receiver.

References Cited in the file of this patent

UNITED STATES PATENTS 2,377,562 Lomax ---------------- June 5, 1945